United States Patent [19]

Rerat

[11] 4,149,876
[45] Apr. 17, 1979

[54] PROCESS FOR PRODUCING TANTALUM AND COLUMBIUM POWDER

[75] Inventor: Carlos F. Rerat, Tulsa, Okla.

[73] Assignee: Fansteel Inc., North Chicago, Ill.

[21] Appl. No.: 913,000

[22] Filed: Jun. 6, 1978

[51] Int. Cl.² .............................................. B22F 9/00
[52] U.S. Cl. .................................. 75/0.5 BB; 75/84.4
[58] Field of Search ............................ 75/0.5 BB, 84.4

[56] References Cited

U.S. PATENT DOCUMENTS

| | | | |
|---|---|---|---|
| 2,950,185 | 8/1960 | Hellier et al. | 75/0.5 BB |
| 3,829,310 | 8/1974 | Mahy | 75/0.5 BB |
| 3,992,192 | 11/1976 | Vartanian | 75/0.5 BB |
| 4,067,736 | 1/1978 | Vartanian | 75/0.5 BB |

Primary Examiner—W. Stallard
Attorney, Agent, or Firm—Dressler, Goldsmith, Clement, Gordon & Shore, Ltd.

[57] ABSTRACT

A method of producing tantalum or columbium powder is described for producing a selected desired particle size powder under controlled conditions with a high rate of production and yield of usable powder. A molten salt bath of an alkali metal tantalum fluoride or an alkali metal columbium fluoride and a relatively large amount of diluent salt to act as a heat sink is initially maintained at a low temperature in the liquidus range, an addition of liquid alkali metal reducing metal is added at a very fast rate to the continuously stirred bath to create a rapid temperature rise to the reaction temperature, and liquid alkali metal is thereafter fed at a fast rate to complete the reaction quickly at the final reaction temperature. Cooling is used for at least a portion of the reaction cycle at a rate sufficient to maintain the final reaction temperature within a desired range.

18 Claims, 7 Drawing Figures

CAPACITANCE OF 1.0-g ANODES PRESSED TO A GREEN DENSITY OF 6.45 g/cm$^3$ FROM AS-REDUCED, THERMALLY AGGLOMERATED, AND PHOSPHORUS-DOPED TANTALUM POWDERS (ANODES SINTERED 30 MIN. AT 1600°C)

CAPACITANCE OF 1.0-g ANODES PRESSED TO A GREEN DENSITY OF 5.5 g/cm$^3$ FROM AS-REDUCED, THERMALLY AGGLOMERATED, AND PHOSPHORUS-DOPED TANTALUM POWDERS (ANODES SINTERED 30 MIN. AT 1600°C)

PROCESS FOR PRODUCING TANTALUM AND COLUMBIUM POWDER

BACKGROUND OF THE INVENTION

This invention is directed specifically to the production of tantalum and columbium powders. These powders have the characteristic of producing very high capacitive charge anodes for the manufacture of electrolytic capacitors. Production of these powders is conducted in a liquid phase with a selected combination of various means of control in order to produce specifically desired particle sizes at a high yield and high rate of production. In a preferred aspect, the invention provided the means of control for the reaction, $$K_2TaF_7 + 5Na \rightarrow Ta + 2KF + 5NaF$$

in order to obtain various desired metal powder particle sizes. The means of control for particle size are primarily the sodium metal addition rate, the heat extraction rate from the exothermic reaction by means of forced cooling, and the addition of diluent salts to serve as an internal heat sink in the bath to enhance sodium metal addition rates.

For convenience of description, the invention is disclosed herein primarily as it relates to the reduction of potassium fluotantalate double salt ($K_2TaF_7$) by metallic sodium in accordance with the above equation.

STATE OF THE ART

Prior to this invention, tantalum (Ta) and columbium (Cb) metal powders were produced principally by the following general methods which are characterized below.

1. Electrolytic reduction of $K_2TaF_7$ or $K_2CbF_7$ in molten baths with various diluent systems comprised of chloride and fluoride salts of sodium and potassium. In this method the production rate was limited to the electrolysis parameters—current and voltage. The concentration gradients established in this system prevented obtaining a high yield and the production rate was relatively low. In all cases, the resulting tantalum powders were relatively coarse and dendritic, and produced anodes for electrolytic capacitors having very low capacitive charge. A considerable amount of impurities was transferred to the product due to the galvanic corrosive activity on the reaction vessel components.

2. Exothermic reactions in a closed vessel wherein the $K_2TaF_7$ or $K_2CbF_7$ was mixed or placed in alternate layers with the reducing agent, both in the solid form. The enclosed charge was indirectly heated until the exothermic reaction was spontaneously initiated. This uncontrollable reaction produced powders having a wide range of particle sizes, and resulted in intermediate yield efficiencies. In order for these materials to be usable in the manufacture of anodes for electrolytic capacitors, they had to be classified extensively. These powders had larger surface areas per unit weight than electrolytic powders. In addition, these types of reactions created hazardous conditions.

3. Stirred liquid phase reactions, such as described in U.S. Pat. No. 2,950,185. In this method the $K_2TaF_7$ was heated in a reaction vessel to a specific temperature above the melting point. Then molten sodium was added at a relatively slow, uniform feed rate corresponding to about 0.02 kg sodium per kg of $K_2TaF_7$ per hour to effect the reaction. All this was done in a bath held at essentially an isothermal temperature, with agitation of the bath effected by an internal agitator. In this method, the resulting powder had a wide range of particle sizes and correspondingly a proportionally large range of surface areas. In order for these materials to be acceptable for the manufacture of anodes for electrolytic capacitors, they required extensive classification to obtain the desired particle size. The capacitive charge that could be obtained from anodes derived from these powders was in the intermediate range. In addition, these materials had high volumetric densities which limited their utilization to anodes pressed at densities higher than about 6.0 gm/cm$^3$.

4. Stirred liquid phase with diluent salts present, such as described in U.S. Pat. No. 2,994,603. The stirred reaction was advanced because it made possible the use of lower bath temperatures through the addition of diluent salts such as NaCl and KCl to the $K_2TaF_7$ charge. The sodium feed rate, where given, was about 0.25 kg Na per kg $K_2TaF_7$ per hour; and no external cooling is disclosed until after completion of the reaction. Typical total reduction times of about 8 hours were used even when small charges were used. These process conditions resulted in agglomerates of finely divided material, a tendency to pick-up impurities, and production of excessive fines.

5. Mulling of diluent salt and $K_2TaF_7$ in the solid form with liquid sodium below 150° C., (such as described in U.S. Pat. Nos. 3,829,310 and 3,992,192), followed by heating the charge to a temperature at which a spontaneous exothermic reaction was initiated. The exothermic reaction was either agitated, intermittently agitated, or non-agitated, until a maximum reaction temperature in the range of about 950° C. was attained. The reaction was maintained at that isothermal temperature for 1 to 8 hours by indirect heating means. This was an exothermic reaction which was not controllable and therefore the product characteristics were not subject to achieving various desired particle sizes and ultimately desirable electrical characteristics. These materials therefore required classification or sorting to remove fine and coarse particles from the finished product prior to their utilization in the manufacture of anodes for electrolytic capacitors.

OBJECTIVES OF THE INVENTION

The objectives of the invention are:

1. To manufacture tantalum metal powders of specific fine size and consistent uniformity for the manufacture of anodes used in high capacitive charge electrolytic capacitors at a very high yield.

2. To manufacture tantalum metal powders of various desired sizes for use in powder metallurgy practices at a very high rate of production and a high yield.

3. To produce tantalum metal powders of very high specific capacitance and low bulk densities which permit the manufacture of anodes for electrolytic capacitors at very low pressed densities which ultimately results in adequately low dissipation factor devices.

4. To produce tantalum metal powders of finer sizes in which effectively the entire product is usable in the manufacture of anodes for electrolytic capacitors by virtue of the similarity in performance of all particle size components of the produced material.

5. To produce tantalum metal powders of fine particle size having very high specific capacitance without the need of classification for the removal of specific sizes (i.e., 0 to 3 microns) or for the concentration of other specific sizes.

6. To produce tantalum metal powders for electrolytic capacitor usage having good cohesion characteristics in anodes pressed at densities of 5.5 gm/cm$^3$ and lower without the necessity of using binders to press the anodes.

7. To produce tantalum metal powders of high specific capacitance with close control over the process of nucleation during the sodium metal reduction of tantalum fluoride salts by means of controllable high sodium metal injection rates and forced cooling applied to the reaction vessel, the rate of sodium metal injection in combination with the rate of cooling are means relatable to control of the desired particle size.

8. To produce tantalum metal powders of fine and uniform particle size starting with a uniform molten bath of $K_2TaF_7$ and a diluent salt at uniform temperatures slightly above the melting point of the salt mixture.

9. To produce tantalum metal powders of coarse particle size from a molten bath maintained at a temperature slightly above the melting point of the mixture and employing high rates of sodium metal injection, continuous agitation, and forced external cooling to provide a control process relatable to the desired particle size.

10. To produce tantalum metal powders of metallurgical grade from a molten bath maintained at a temperature slightly above the melting point of the mixture and employing high rates of sodium metal injection, continuous agitation and forced external cooling to provide a control process relatable to the desired particle size at a high rate of production and a high yield.

These and further objectives of the invention will be evident from the following detailed description and specific examples.

All objectives of this invention, while illustrated for a specific reactor, can be applied to reactors of other sizes, smaller and larger, than the specific embodiments.

All objectives of the invention as illustrated by the methods of cooling in the examples are not limited to these methods but include other means which will become evident in the description of the embodiments.

All principles described in the embodiments of the invention relating to production of tantalum metal powder can be used to produce specific powder sizes from halide salts of columbium in the liquid form in combination with diluents NaCl and KCl and reduced with a reducing alkali metal, also in the liquid form.

All principles described in the embodiments of the invention can be used in conjunction with other diluent systems comprised of the fluorides, chlorides, bromides, and iodides of the alkali metals provided that they are in a liquid homogeneous phase with the salt to be reduced.

All principles described in the embodiments of the invention can be used in conjunction with other alkali metal reducing agents of the group consisting of potassium, lithium, ribidium, and cesium, provided that they are in the liquid form at the point of injection into the reaction vessel.

In general, the system of the present invention is applicable to the reduction of double salts of the formula $R_2MX_7$, when R is an alkali metal, M is a metal of the group consisting of tantalum and columbium and X is a halogen of the group consisting of fluorine, chlorine and bromine.

SUMMARY OF THE INVENTION

According to the preferred aspect of this invention a molten bath of $K_2TaF_7$ and a diluent salt maintained at a temperature above the liquidus temperature but significantly below the preferred reduction temperature is reacted with molten sodium until a specific reduction temperature is reached. This period of the overall reaction during which the temperature of the charge increases from the initial bath temperature to the reduction temperature is herein called the "nucleation period." During this period of nucleation the rate of sodium addition is controlled. When it is desired to produce very fine particle size tantalum powder metal to be used in the manufacture of anodes employed in the manufacture of high capacitive charge electrolytic capacitors, the sodium metal is added at a very high rate until the reduction temperature is reached. To produce particles of an average size smaller than 5 microns ($\mu$m) (measured as described below), it is preferred that the rate of temperature rise during the nucleation period be at least 20° C. per minute. For somewhat larger particles (averaging 5 to 8 microns the rate of temperature rise may be lower, but at least 10° C. per minute. It has been found that the rate of sodium injection (feed rate into the reactor) during the nucleation period has an inverse effect on the particle size of the finished product. More specifically, it has been found that the average size of the finished product is inversely related to the rate of temperature rise with respect to time during the nucleation period, and also to the time to complete the addition of the required stoichiometric amount of sodium at that specified reduction temperature, herein called the "growth period."

Another factor tending to achieve finer particle size tantalum powders is the use of large amounts of diluents such as NaCl, which also can serve as an internal heat absorber or heat sink in the system. Ratios of diluent to double salt in the range between about 0.6 and 1.0 (by weight) tend to produce smaller particles, averaging less than about 5 microns, while lower ratios from about 0.25 to about 0.6 (by weight) tend to produce somewhat larger particles, averaging from about 5 to about 8 microns.

Another factor that has been discovered to produce fine particle sizes is the starting of the sodium injection into the molten bath at the lowest possible temperature. Starting at a low temperature consumes proportionally large amounts of sodium for any given rate of temperature increment and consequently reduces the overall process time.

Another important factor in the control of particle size is the temperature of reduction. Temperatures from about 760° C. to about 850° C. tend to produce smaller particles, while the temperatures from about 850° C. to about 1000° C. tend to produce somewhat larger particles.

An important element in connection with the maintainance of rapid temperature rise at large sodium injection rates is the extraction of a portion of the heat generated by the reaction $$K_2TaF_7 + 5Na \rightarrow Ta + 2KF + 5NaF$$

by means of forced cooling of the reaction mass in the reaction vessel. Usage of forced cooling significantly reduces the overall process time and further reduces the particle size of the powder produced.

The term "forced cooling" as used herein refers to procedures for temperature reduction over and beyond the natural cooling that takes place by heat loss through the walls of the reactor to ambient air and heat absorption that takes place as the relatively cool liquid alkali metal is heated up to bath temperature. Among the suitable procedures are (a) the use of high velocity streams of air or other coolant gas directed around the exterior of the reaction vessel, (b) the use of a coolant jacket around the reaction vessel, (c) the use of coolant coils within the reaction mass, and (d) the use of coolant sprays of liquid directed against the exterior of the reaction vessel.

Preferably the rate of forced cooling will provide the removal of at least 10 kilocalories per minute per kilogram of the double salt and will be at at least 50% of the rate that exothermic heat is generated in the reaction zone during the growth period. The rate of exothermic heat generation may be calculated from the rate of alkali metal feed and the heat of formation of the sodium fluoride product.

The rate of forced cooling may be calculated from the rate of coolant flow and the temperature rise of the coolant, taking into consideration its specific heat. Where the coolant changes phase, from liquid to vapor (as $H_2O$), or from solid to vapor (as $CO_2$), the latent heat of vaporization is also a factor.

Alternatively, the rate of forced cooling may be calculated (where the reaction temperature remains substantially constant) by subtracting from the rate of exothermic heat generation of a force cooled system, the rate of exothermic heat generation of a similar system (maintained at the same temperature) which does not have forced cooling. In making the latter calculation, allowance should be made for the increased rate of heat absorption by reason of heating more alkali metal to bath temperature in the system utilizing forced cooling.

In accordance with this invention the rate of alkali metal feed during the growth period and the rate of forced cooling are maintained in balance so that the reaction temperature remains substantially constant during the growth period. The temperature should vary by no more than about 50° C. from the desired reaction temperature; preferably by no more than about 25° C., and most preferably by no more than about 10° C.

These improvements in combination—large amounts of diluent salt, low initial molten bath temperature, very fast sodium feed rate, and use of forced cooling to maintain constant temperature during the growth period—result in significantly more uniform and finer particle size powder than that from state-of-the-art procedures.

The above-described means to obtain fine particle size tantalum metal powder with exceptional properties for the manufacture of anodes employed in the production of electrolytic capacitors can be equally well applied to the manufacture of somewhat coarser particle size powders to achieve the same added benefits of high productivity and high yield.

The improved means to produce tantalum metal powders also can be applied to the production of other metal powders where controlled particle size is required at large productivity rates and high yields, such as columbium metal powder produced by the reaction

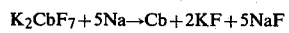

BRIEF DESCRIPTION OF THE DRAWINGS

These and other objects and advantages of the present invention will become more apparent in the following detailed specification along with the accompanying drawings in which.

DETAILED DESCRIPTION OF PREFERRED EMBODIMENTS OF THE INVENTION

Figure 1:
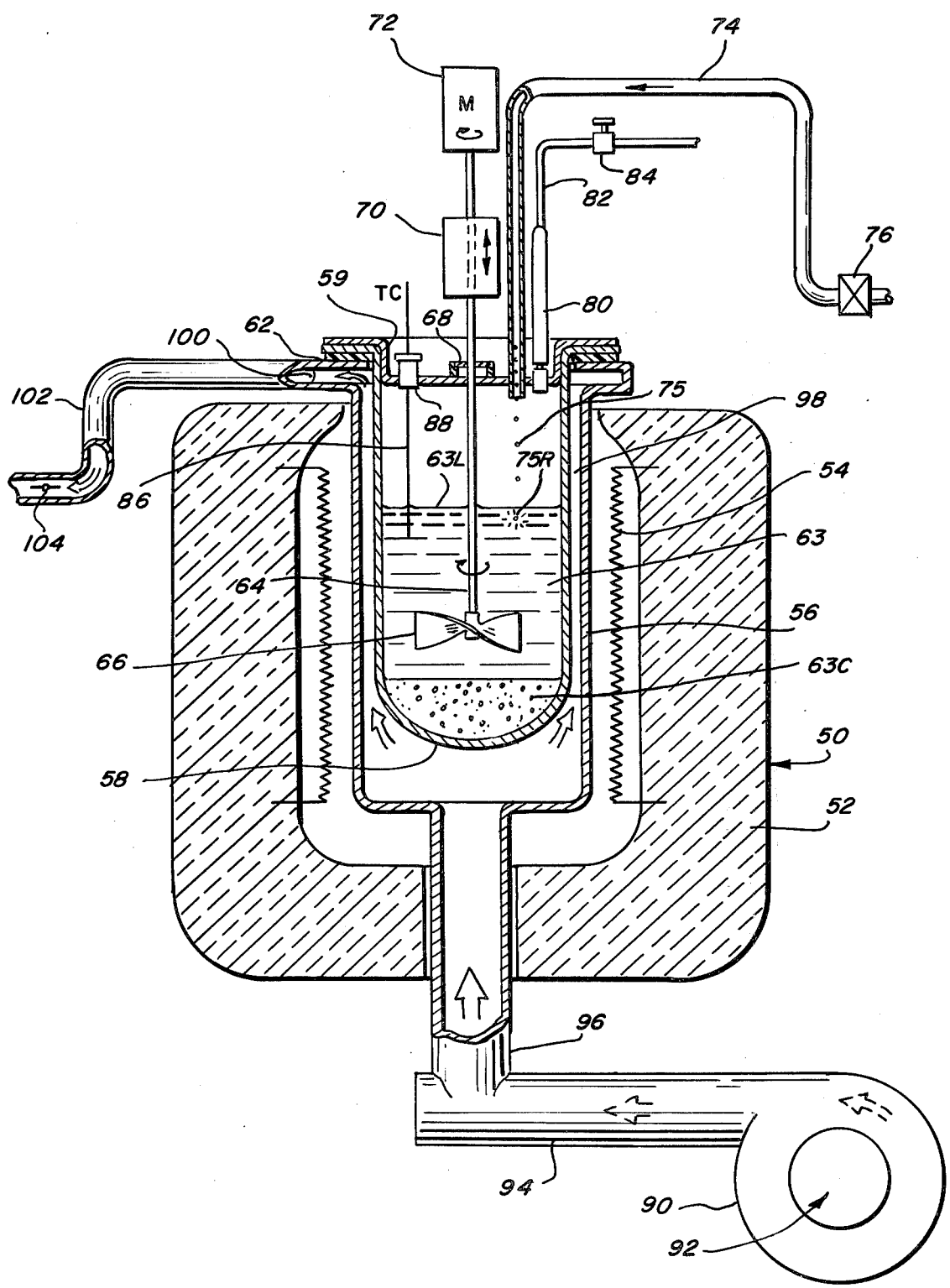
FIG. 1 is a sectional view of exemplary apparatus used in the process of the present invention.

In FIG. 1 is shown a cross-section of a reactor vessel 50 for conducting reduction of $K_2TaF_7$ using rapid feed rates for the sodium reducing metal and forced external cooling. The vessel has thermal insulation 52 and can be heated by electrical resistance heating elements 54. Liner 56, constructed of a material such as stainless steel, surrounds a retort 58, which is constructed of a heat resistant alloy such as Inconel. Lid 59 of the retort has flange 60 sealed by gasket 62 to exterior port flange 100 of liner 56.

The molten salt bath 63 is comprised of a metal fluoride (or chloride) salt, such as $K_2TaF_7$, and a selected amount of diluent salt such as NaCl or KCl, or a mixture of these. The liquid level 63L of the salt bath and tantalum crystals 63C that build up during the reaction also are illustrated.

In the example embodiments of the invention to be described in greater detail, the salt bath is initially molten before the sodium addition. In the specific reactor used, the amount of $K_2TaF_7$ in the molten bath ranged from about 500 to 1000 kg. and the diluent salt from about 200 to 450 kg., while the weight ratio of diluent salt to $K_2TaF_7$ ranged from about 0.2 to 1.0, and the mole ratios from about 0.8 to 4.6. The specific amounts of diluent salt and $K_2TaF_7$ used, and their weight ratio depended on the specific particle size of tantalum powder to be produced. The higher amounts of diluent salt were used when the finest particle size tantalum powders were produced.

When adequate volume was available in the retort, the entire amounts of $K_2TaF_7$ and diluent salt were added as solid salts to the reactor and were melted together. In some cases where higher amounts of diluent salt were desired, all of the $K_2TaF_7$ and a portion of the diluent salt were melted first, then the balance of the diluent salt was added as one or more supplementary additions.

Agitation of the bath is maintained during the reduction reaction by agitator 64. The agitator has blades 66 with an outside diameter typically about one-half that of the inside diameter of the retort. The blades generally $K_2CbF_7 + 5Na \rightarrow Cb + 2KF + 5NaF$ have a pitch in the range of about 30 to 60 degrees, typically about 45 degrees with respect to the agitator shaft.

The agitator extends vertically upward through seal 68 positioned on the retort lid to engage to vertical drive means 70 and rotary drive means 72.

Agitation is provided continuously from the time the salt bath is molten until the completion of the reduction reaction. In preferred embodiments, the agitator speed is typically varied in the range from about 70 to 140 rpm during the run, or from about 0.05 to 0.50 rpm per kg of the molten salt mixture when said mixture is in the range of 500 to 1000 kg. The slower speeds are used initially to obtain a homogenous molten salt bath before beginning the sodium feed. Fastest agitator speeds are used during the nucleation period when the highest sodium feed rate is used, then slower speeds are employed during subsequent lower sodium feed rates, and also after completion of the sodium feed.

Although changing agitator speeds during the run is a preferred procedure, satisfactory results can be achieved in this invention using a fixed agitator speed during the run.

Another preferred procedure is to intentionally and progressively raise the position of the agitator during the period when the sodium is added. This is done using the vertical drive means to raise the agitator continuously or in steps, typically about 2 inches per step, upward about 4 to 12 inches above its initial position. This is done to avoid plowing of the tantalum metal powder particles that settle and progressively build up on the retort bottom, and to compensate for the added bath volume resulting from the sodium additions.

Although progressive raising of the agitator is a preferred practice, satisfactory results can be achieved in this invention by proper initial vertical placement of the agitator in an essentially mean position.

Specific combinations of agitator design, rotational speed and change, and intentional vertical raising of the agitator are used in an effort to achieve a continuously homogenous bath composition during the runs made under different process conditions within the scope of this invention to achieve the desired final tantalum particle sizes.

Molten sodium at a temperature of about 100°–160° C. is introduced through line 74 extending through the retort lid. Drops or a stream 75 of sodium react in the molten bath when it contacts $K_2TaF_7$ as illustrated at 75R. The flow rate of sodium is controlled by valve 76 in the line from a heated sodium tank (not shown). Sodium condenser 80 is connected to the retort lid, and has a line 82 leading to a safety pop-off valve 84.

Thermocouple 86 is immersed in the molten bath and extends through seal 88 to a temperature recorder and controller (not shown).

A means for forced external cooling of the retort is provided by blower 90. Ambient air or other coolant such as liquid or gaseous $CO_2$ are introduced at inlet 92 in the blower. The coolant flow proceeds through duct 94 connected to extension 96 leading to the interior of liner 56, then upward in the space 98 between the retort 58 and the liner to provide cooling to the retort. The coolant flow then proceeds through a collection manifold 101 located at the top of the liner, then is vented through duct 102 containing a damper 104, or it may be recirculated by providing a means for heat removal (not shown).

In the exemplary embodiments, forced air cooling on the external of the retort was generally used. With a 36-inch ID retort, air flow rates used to cool the exterior of the retort ranged from about 500 to 3000 cfm. The highest rates were used in the process parameters employed to produce the finest tantalum powder particle sizes.

Cooling of the retort can be further enhanced by providing fins on other suitable configurations on the exterior of the retort.

Forced air cooling and liquid carbon dioxide cooling are described in examples of the process. However such cooling methods are not limiting, and this invention also contemplates other means for forced cooling, such as coolant coils or a coolant jacket, sprays, and other methods.

When this process is used for producing columbium by sodium reduction of $K_2CbF_7$, the preferred ratio of diluent salt, such as NaCl, to $K_2CbF_7$ is about the same on a mole basis as for the ratio of NaCl to $K_2TaF_7$, namely about 0.8 to 4.6 as described above. The preferred sodium feed rates for reducing $K_2CbF_7$ are about 30% greater than described in the examples for sodium reduction of $K_2TaF_7$.

The following examples serve to assist in an understanding of the invention:

EXAMPLE 1

This describes a state-of-the-art practice for producing tantalum powder for use in electrolytic capacitor applications. A stirred reaction with diluents was made using the reaction equipment illustrated in FIG. 1, except that the reactor was not provided with a means for external forced cooling.

Quantities of 454.5 kg of $K_2TaF_7$ and 218 kg of NaCl were charged into a reaction vessel. The closed vessel and its charge were heated to a temperature of 720° C. to melt the charge and the agitator was started soon thereafter to homogenize the liquid bath. Agitator speed was maintained at 70 rpm.

After a period of homogenization at 720° C., liquid sodium metal at a temperature of 148° C. was added to the vessel at a rate of 0.301 kg/minute or 0.0397 kg of Na/kg of $K_2TaF_7$ per hour until a temperature of 790° C. was reached 120 minutes thereafter. Then an approximate liquid sodium metal injection rate of 0.211 kg of Na/minute or 0.0279 kg of Na/kg of $K_2TaF_7$ per hour was used to maintain a growth period temperature of 790° C. The growth period lasted 455 minutes or 7.55 hours; and during this period about 1230 kilocalories per minute were generated at the low sodium feed rate. During the growth period the agitator speed was continued to be maintained at 70 rpm.

The reaction mass was allowed to cool to ambient temperature and the tantalum metal powder produced was recovered from the frozen mass by conventional state-of-the-art methods involving crushing and leaching.

Figure 2:
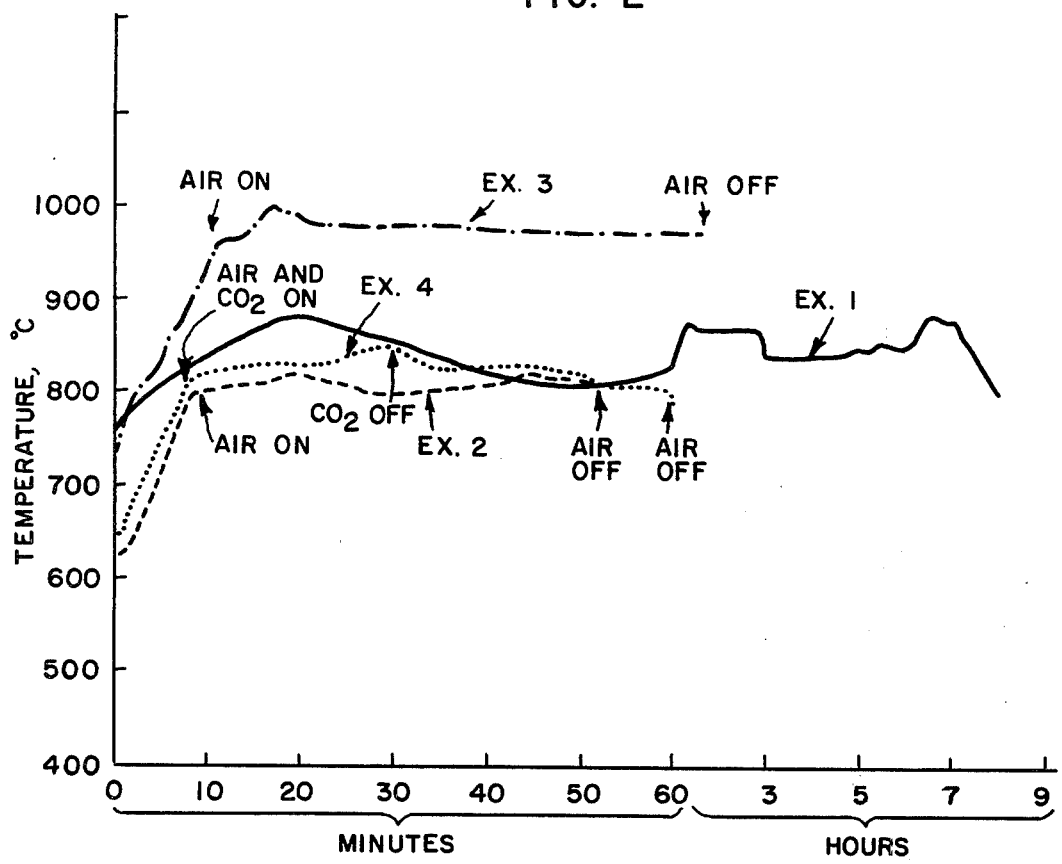
FIG. 2 shows temperature-time thermal cycle diagrams related to Examples 1, 2, 3 and 4.

FIG. 2 includes a graph of temperature vs time from the start to the end of the sodium metal feed. Note that in this graph the time cycle is shown in minutes up to one hour, and thereafter continues in hour intervals for convenience in comparing this state-of-the-art example with embodiments of this invention described in the later examples.

The tantalum powder was analyzed for chemical composition by conventional state-of-the-art procedures. The impurity levels that were determined are listed in Table I. The powder was subjected to a sieve analysis test using U.S. Standard screens to determine the percent by weight of +80 Mesh, −80 +325 Mesh, and −325 Mesh material. The data are also listed in Table I, and the amount of −80 Mesh portions is plotted in FIG. 4. The −80 Mesh portions were combined, blended and used for all other tests.

Figure 4:
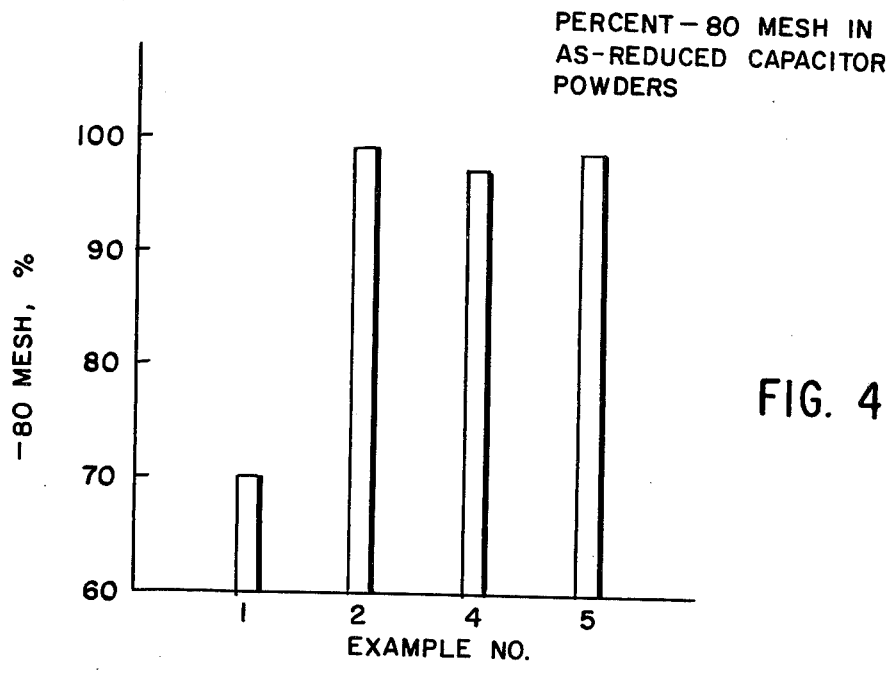
FIG. 4 compares the percentage of −80 Mesh powder related to Examples 1, 2, 4 and 5.

The particle size of this powder was measured as Fisher sub-sieve size (FSSS) in accordance with ASTM designation B330-65, "Standard Method of Test for Average Particle Size of Refractory Metals and Compounds by the Fisher Sub-sieve Sizer." The data are included in Table I and plotted in FIG. 4. Apparent density, hereafter called "Scott density" (SD), was determined on this powder by the procedure of ASTM designation B212-48, (Reapproved 1970), "Standard Method of Test for Apparent Density of Metal Powders," and the value is listed in Table I.

A portion of the −80 Mesh powder was tested for electrical properties in the "as-reduced" condition.

A second portion of the −80 Mesh powder was heated in a vacuum of about $10^{-3}$ torr absolute pressure to about 1400° C. (optical temperature), held for 1 hour at temperature, cooled under vacuum for 2 hours and finally under helium to ambient temperature, then milled and screened using a 35 Mesh screen, with any oversize material remilled and rescreened so that all powder was −35 Mesh. This tantalum powder is referred to as "thermally agglomerated" powder produced according to the teachings of (Pierret) U.S. Pat. No. 3,473,915.

Each type of powder was individually weighed and pressed into 1.0 gram compacts or anodes with an embedded tantalum lead wire in a 0.213 inch diameter die to a green density of 6.45 g/cm$^3$. Efforts to press compacts of these powders to a green density of 5.5 g/cm$^3$ were unsuccessful because the green strengths were too low and inadequate for handling.

The anodes pressed to a green density of 6.45 were sintered for 30 minutes at 1600° C. (optical temperature) in a cold-wall, vacuum sintering furnace ($10^{-5}$ torr absolute pressure).

The percent shrinkage (in diameter) that occurred during sintering was determined.

The electrical testing procedure involved anodizing the sintered anodes in 0.1% phosphoric acid in water at an electrolyte temperature of 90° C. Anodizing was carried out at a current density of 35 milliamps per gram until 100 volts was reached, and then they were held for 2 hours at 100 volts. The anodized anodes were washed in deionized water and then dried in clean air at 105° C.

Direct current leakage (DCL) was measured at a test voltage of 70 volts in 10% phosphoric acid. The anodes were immersed in the test solution to the top of the anode and the test voltage was applied for 2 minutes, after which the DCL was measured.

After DCL measurements were completed, the anodes were soaked in 10% phosphoric acid for 30 to 45 minutes.

The capacitance was measured on the anode immersed in 10% phosphoric acid employing a type 1611B General Radio Capacitance Test Bridge with an a.c. signal of 0.5 volts and a d.c. bias of 3 volts. The dissipation factor also was determined from this bridge test.

Figure 6:
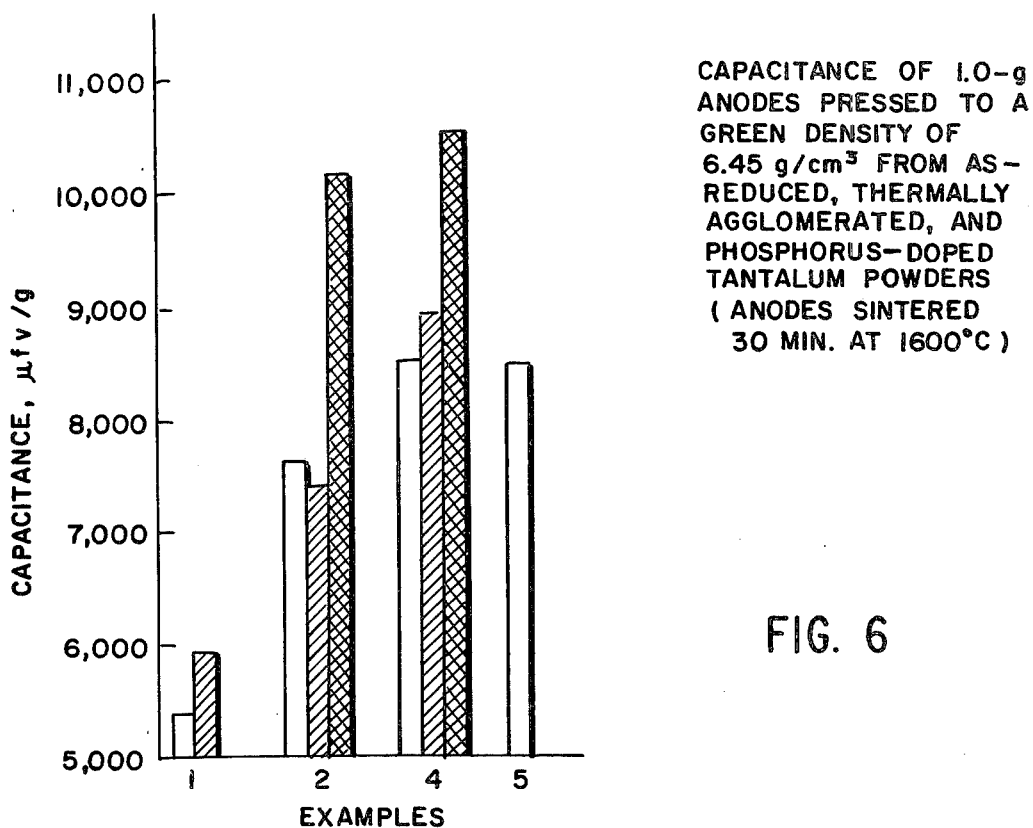
FIG. 6 displays the specific capacitance of as-reduced, and (in some cases) thermally agglomerated, and phosphorus-doped powders related to Examples 1, 2, 4 and 5 and pressed with a green density of 6.45 g/cm$^3$ to 1.0-g anodes and sintered 30 minutes at 1600° C.
Figure 7:
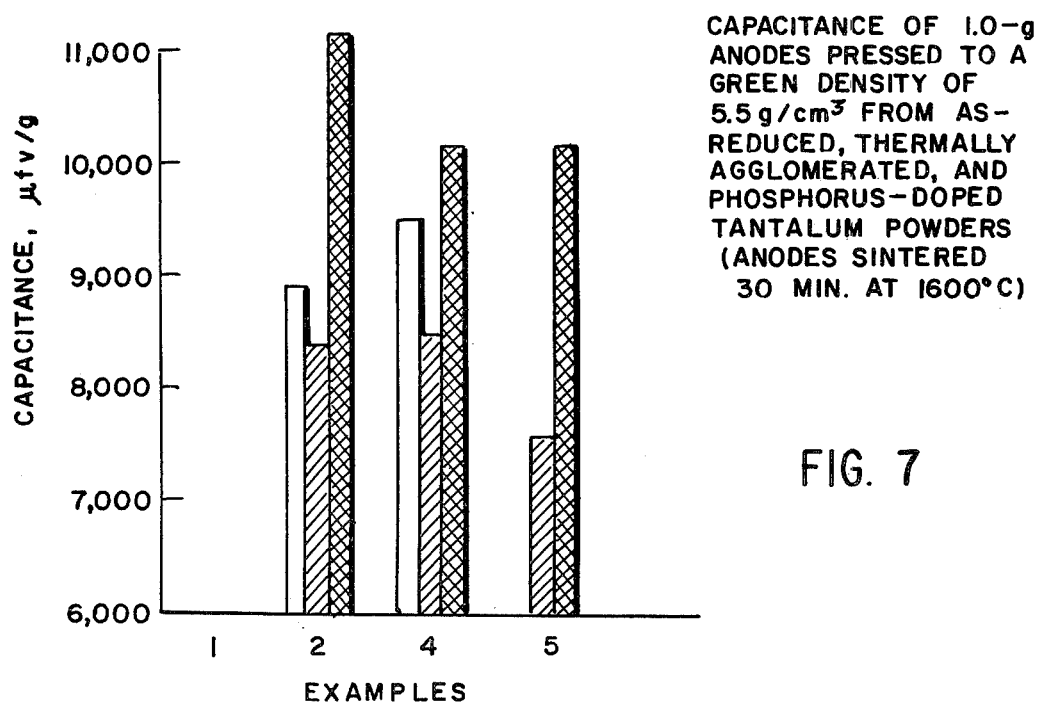
FIG. 7 is similar to FIG. 6 except for a green density of 5.5 g/cm$^3$.

The average values for shrinkage during sintering, DCL, specific capacitance ($\mu$fv/g), and dissipation factor for both the "as-reduced" and the "thermally agglomerated" powders are summarized in Table II. The specific capacitance data also are plotted in FIG. 6.

EXAMPLE 2

This example describes an embodiment of this invention using forced external air cooling on the reactor during a portion of the reduction cycle.

A stirred reaction was made for the purpose of producing fine particle size tantalum powder having very high specific capacitance using a primary charge consisting of 454 kg of $K_2TaF_7$ and 218 kg of NaCl. The primary charge was heated in a closed reactor as described in FIG. 1 and provided with a blower rated at 1500 ft$^3$/minute for applying forced external air cooling. The primary charge was heated to a temperature of 740° C. to melt the charge, and the agitator was started soon thereafter to homogenize the primary liquid bath. After the primary liquid bath was homogenized, an additional 218 kg of NaCl at ambient temperature was introduced into the reaction vessel. The secondary charge was allowed to homogenize with the primary bath for approximately 15 minutes at which time a stable bath temperature of 640° C. was reached. During the period of primary and secondary charge homogenization, an agitator speed of 120 rpm was employed. When the bath temperature reached a stable temperature of 640° C., liquid sodium metal at a temperature of 140° C. was injected into the reaction vessel at a rate of 5.17 kg of Na/minute or 0.683 kg of Na/kg of $K_2TaF_7$ per hour until a charge temperature of 820° C. was reached. This period of nucleation required 9 minutes. After reaching 820° C. the blower providing the external forced cooling was turned on and maintained on during the balance of the growth period until the required amount of sodium metal had been added. During the growth period a sodium injection rate of 1.563 kg of Na/minute or 0.207 kg of Na/kg of $K_2TaF_7$ per hour was maintained in order to sustain a growth period temperature of 820° C. ±10° C. and to generate 9060 kilocalories per minute. The growth period consumed 64 minutes or 1.06 hours. One hour after the start of sodium injection into the reactor the agitator speed was changed to 70 rpm and maintained at that speed until 1.5 hours after completion of the required sodium addition. A total of 135.6 kg of sodium was added to the reactor. During the growth period the forced air cooling extracted 7530 kilocalories per minute or 15.59 kilocalories per minute per kilogram of $K_2TaF_7$.

The reaction mass was allowed to cool to ambient temperature and the tantalum metal powder produced was recovered as described in Example 1. To further illustrate this example, FIG. 2 includes a graph of the temperature vs. time cycle from the start to the end of the sodium metal addition. Note that the total reduction time is only about one-sixth as long as that in Example 1.

Figure 5:
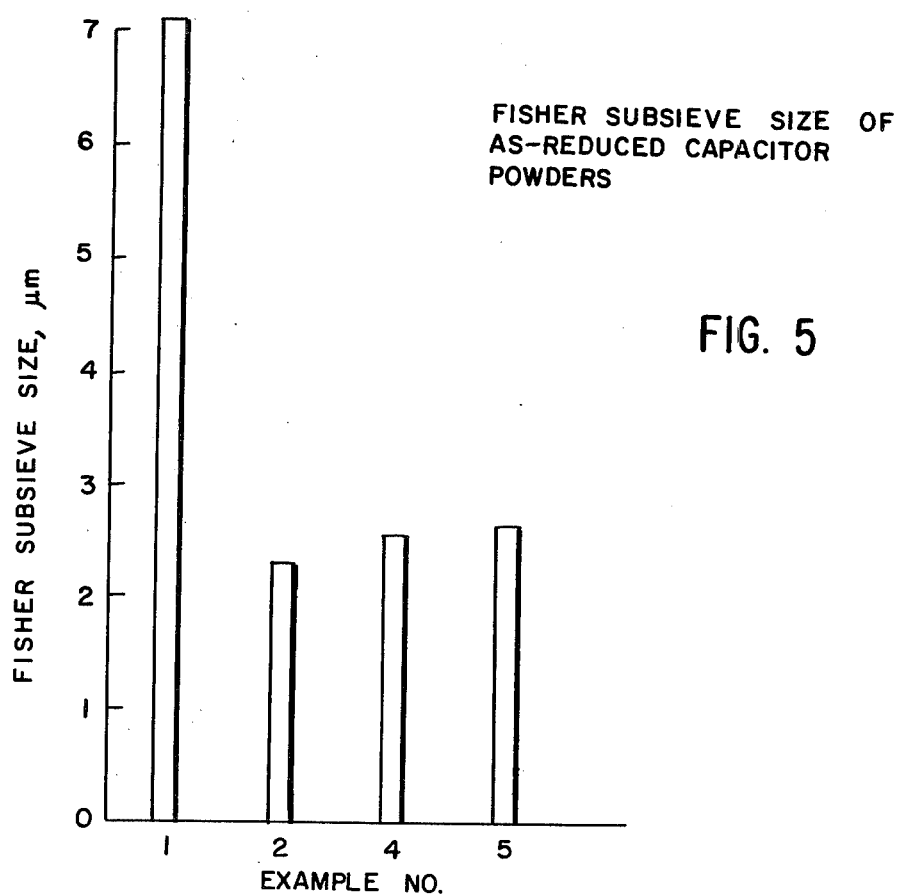
FIG. 5 compares the Fisher subsieve size of powders related to Examples 1, 2, 4 and 5.

The yield of −80 Mesh powder was 99.3% vs. 70% in Example 1, and the SD and FSSS of the powder from Example 2 also was substantially lower than the SD and FSSS of the powder from Example 1 as shown in Table I and FIGS. 4 and 5.

A portion of the −80 Mesh powder was doped with 50 ppm contained phosphorus added by dryblending $(NH_4)_2HPO_4$ (diammonium phosphate) with the tantalum powder, then subjecting the powder to the above described thermal agglomeration treatment. This resulted in a "phosphorus-doped" tantalum powder according to the teachings of (Fry) U.S. Pat. No. 4,009,007.

The specific capacitance for anodes pressed at 6.45 g/cm$^3$ and sintered 30 min. at 1600° C. was about 42% higher than for anodes similarly pressed and sintered from the state-of-the-art powder of Example 1. The specific capacitance for anodes pressed at 5.5 g/cm$^3$ was 11,160 μfv/g in the case of the phosphorus-doped powder. The test results are shown in Tables I, II and III and in FIGS. 4, 5, 6 and 7.

EXAMPLE 3

This example describes an embodiment of this invention for intentionally producing a tantalum powder of moderately coarse particle size.

A stirred reaction was made for the purpose of producing a coarse particle size tantalum powder for powder metallurgy purposes using a primary charge consisting of 500 kg of $K_2TaF_7$ and 136 kg of NaCl. The primary charge was heated in a closed reactor as described in FIG. 1 and provided with a blower rated at 1500 ft$^3$/minute for applying forced external air cooling. The primary charge was heated to a temperature of 720° C. to melt the charge, and the agitator was started soon thereafter to homogenize the primary liquid bath. During the period of primary homogenization an agitator speed of 100 rpm was employed.

When the bath temperature reached a stable temperature of 720° C., liquid sodium metal at a temperature of 140° C. was injected into the reaction vessel at a rate of 4.42 kg of Na/minute or 0.530 kg of Na/kg of $K_2TaF_7$ per hour until a charge temperature of 965° C. was reached. This period of nucleation required 13 minutes.

After reaching 965° C., the blower providing the external forced cooling was turned on and maintained on during the balance of the growth period or until the required amount of sodium metal had been added. During the growth period a sodium injection rate of 1.38 kg of Na/minute or 0.166 kg of Na/kg of $K_2TaF_7$ per hour was maintained in order to sustain a growth period temperature of 965° C. ±25° C. The growth period consumed 67 minutes or 1.1 hours. During the period of injection into the reactor, the agitator speed was maintained at 120 rpm until 1.5 hours after completion of the required sodium addition. A total of 148.5 kg of sodium was added to the reactor. During the growth period, the reaction generated 7950 kilocalories per minute; and the forced cooling extracted 6400 kilocalories per minute, or 12.82 kilocalories per minute per kilogram of $K_2TaF_7$.

The reaction mass was allowed to cool to ambient temperature and the tantalum metal powder produced was recovered as described in Example 1. FIG. 2 includes a graph showing the temperature vs. time cycle from the start to the end of sodium metal addition. The total reduction time was only about one-sixth that of Example 1.

The values for chemical composition, sieve analysis, SD and FSSS are listed in Table I, and are generally similar to those for Example 1.

EXAMPLE 4

In this example an embodiment is described for producing a fine particle size tantalum powder in which liquid $CO_2$ was employed in forced external cooling of the retort.

A stirred reaction was made for the purpose of producing fine particle size tantalum powder having very high specific capacitance using a primary charge consisting of 454 kg of $K_2TaF_7$ and 218 kg of NaCl. The primary charge was heated in a closed reactor as described in FIG. 1, and provided with a blower rated at 1500 ft$^3$/minute for applying forced external cooling. In addition, means to introduce liquid $CO_2$ into the entrance port of the blower was provided. The primary charge was heated to a temperature of 730° C. to melt the charge, and the agitator was started soon thereafter to homogenize the primary liquid bath. After the primary liquid bath was homogenized, an additional 218 kg of NaCl at ambient temperature was introduced into the reaction vessel. The secondary charge was allowed to homogenize with the primary bath for approximately 15 minutes at which time a stable bath temperature of 640° C. was reached. During the period of primary and secondary charge homogenization, an agitator speed of 120 rpm was employed.

When the bath temperature reached a stable temperature of 640° C., liquid sodium metal at a temperature of 140° C. was injected into the reaction vessel at a rate of 6.32 kg of Na/minute or 0.835 kg of Na/kg of $K_2TaF_7$ per hour until a charge temperature of 800° C. was reached. This period of nucleation required 8 minutes. After reaching 800° C. the blower providing the external forced cooling was turned on and maintained on during the balance of the growth period or until the required amount of sodium metal had been added. In addition, simultaneously with the introduction of the forced air external coolant, liquid $CO_2$ was introduced in the sublimed form into the suction port of the blower. The $CO_2$ additional cooling was maintained for approximately 10 minutes, wherein approximately 54.5 kg of $CO_2$ were consumed. During the growth period, a sodium injection rate of 2.18 kg of Na/minute or 0.288 kg of Na/Kg of $K_2TaF_7$ per hour was used in order to maintain a growth period temperature of 800° C. ±10° C. The growth period consumed 50 minutes or 0.83 hours. One hour after the start of sodium injection into the reactor, the agitator speed was changed to 70 rpm and maintained at that speed until 1.5 hours after completion of the required sodium addition. A total of 135.6 kg of sodium were added to the reactor. During the growth period, the reaction generated 13,320 kilocalories per minute, the forced air and carbon dioxide cooling extracted an average of 11,660 kilocalories per minute or 25.68 kilocalories per minute per kilogram of $K_2TaF_7$.

The reaction mass was allowed to cool to ambient temperature and the tantalum metal powder produced was recovered as described in Example 1. FIG. 2 includes a graph showing the temperature vs. time cycle from the start to the end of sodium metal addition. The total reduction time was less than one-eighth that of Example 1.

Compared to the state-of-the-art powder from Example 1, the powder produced by the process of Example 4 showed a much higher amount of −80 Mesh material, lower SD and FSSS, and a specific capacitance about 58% higher for as-reduced powder pressed at 6.45 g/cm$^3$ and sintered 30 minutes at 1600° C. The specific capacitance for as-reduced and for thermally agglomerated powders pressed at 5.5 g/cm$^3$ and sintered for 30 minutes at 1600° C. also was higher than for the embodiments described in Example 2. The test results are shown in Tables I, II and III and in FIGS. 4, 5, 6 and 7.

EXAMPLE 5

In this example an embodiment of the invention is described for producing a fine particle size tantalum powder in which external forced air cooling was employed during the entire time when sodium was fed.

A stirred reaction was made for the purpose of producing fine particle size tantalum powder having very high specific capacitance using a primary charge consisting of 454 kg of $K_2TaF_7$ and 218 kg of NaCl. The primary charge was heated in a closed reactor as described in FIG. 1 and provided with a blower rated at 1500 ft$^3$/minute for applying forced external air cooling. The primary charge was heated to a temperature of 740° C. to melt the charge, and the agitator was started soon thereafter to homogenize the primary liquid bath. After the primary liquid bath was homogenized, an additional 218 kg of NaCl at ambient temperature was introduced into the reaction vessel. The secondary charge was allowed to homogenize with the primary bath for approximately 15 minutes at which time a stable bath temperature of 640° C. was reached. During the period of primary and secondary charge homogenization, an agitator speed of 120 rpm was employed.

When the bath temperature reached a stable temperature of 640° C., liquid sodium metal at a temperature of 140° C. was injected into the reaction vessel at a rate of 6.72 kg of Na/minute or 0.888 kg of Na/kg of $K_2TaF_7$ per hour until a charge temperature of 800° C. was reached. This rate is about 22 times as fast as that used in Example 1. This period of nucleation required 8 minutes. Simultaneously with the start of sodium metal injection the blower that provided the forced air external cooling was turned on and maintained on during both the entire nucleation period and growth periods until the completion of the sodium metal addition. During the growth period, a sodium injection rate of 2.14 kg of Na/minute or 0.283 kg of Na/kg of $K_2TaF_7$ per hour was maintained in order to maintain a growth period temperature of 800° C. ±10° C. This rate is more than 10 times as fast as that used in Example 1. The growth period consumed 50 minutes or 0.83 hours. One hour after the start of sodium injection into the reactor the agitator speed was changed to 70 rpm and maintained at that speed until 1.5 hours after completion of the required sodium addition. A total of 135.6 kg of sodium was added to the reactor. During the growth period, the reaction generated 13,330 kilocalories per minute; the forced air cooling extracted 11,660 kilocalories per minute, or 25.68 kilocalories per minute per kilogram of $K_2TaF_7$.

The test results are shown in Tables I, II and III and in FIGS. 4, 5, 6 and 7.

Figure 3:
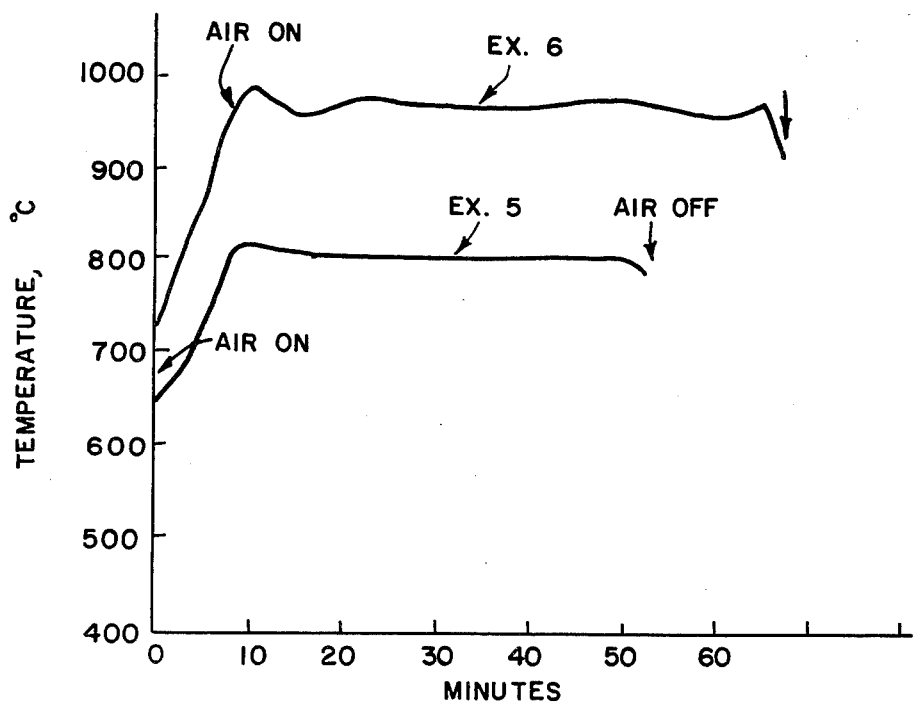
FIG. 3 shows temperature-time thermal cycle diagrams related to Examples 5 and 6.

The reaction mass was allowed to cool to ambient temperature and the tantalum metal powder produced was recovered as described in Example 1. FIG. 3 includes a graph showing the temperature vs. time cycle from the start to the end of sodium metal addition.

Compared to Example 1, the powder produced by the process of Example 5 exhibited a much higher %−80 Mesh material, much lower SD and FSSS, and about 58% higher specific capacitance (as-reduced powder pressed at 6.45 g/cm$^3$, sintered 30 minutes at 1600° C.).

EXAMPLE 6

This example, like Example 3, describes an embodiment of the invention for intentionally producing a coarse particle size tantalum powder, but using still faster sodium feed rates and a larger charge of $K_2TaF_7$ and diluent salt.

A stirred reaction was made for the purpose of producing coarse particle size tantalum powder for powder metallurgy purposes using a primary charge consisting of 636 kg of $K_2TaF_7$ and 173 kg of NaCl. The primary charge was heated in a closed reactor as described in FIG. 1 and provided with a blower rated at 1500 ft$^3$/minute for applying forced external air cooling. The primary charge was heated to a temperature of 750° C. to melt the charge, and the agitator was started soon thereafter to homogenize the primary liquid bath. During the period of primary charge homogenization an agitator speed of 120 rpm was employed.

When the bath temperature reached a stable temperature of 750° C., liquid sodium metal at a temperature of 140° C. was injected into the reaction vessel at a rate of 6.20 kg of Na/minute or 0.585 kg of Na/kg of $K_2TaF_7$ per hour until a charge temperature of 985° C. was reached. This period of nucleation required 6 minutes. After reaching 985° C., the blower providing the external forced cooling was turned on and maintained on during the balance of the growth period or until the required amount of sodium metal had been added. During the growth period a sodium injection rate of 1.58 kg of Na/minute or 0.149 kg of Na/kg of $K_2TaF_7$ per hour was maintained in order to maintain a growth period temperature of 985° C. ±25° C. The growth period consumed 103 minutes or 1.71 hours. During the period of nucleation and growth the agitator speed was 120 rpm and was maintained at that speed until one hour after completion of the required sodium addition. A total of 189.9 kg of sodium was added to the reactor. During the growth period, the reaction generated 9110 kilocalories per minute; and the forced cooling extracted 7580 kilocalories per minute, or 11.93 kilocalories per minute per kilogram of $K_2TaF_7$.

The reaction mass was allowed to cool to ambient temperature and the tantalum metal powder produced was recovered as described in Example 1. FIG. 3 includes a graph showing the temperature vs. time cycle from the start to the end of sodium metal addition.

The as-reduced powder had a FSSS of 5.85 microns and a SD of 68.2 g/cm$^3$.

The physical properties and the chemical compositions of the powders produced in Examples 1 through 6 are shown in Table I.

TABLE I

PHYSICAL PROPERTIES AND CHEMICAL COMPOSITIONS OF AS-REDUCED POWDERS

| Example No. | 1 | 2 | 3 | 4 | 5 | 6 |
|---|---|---|---|---|---|---|
| Sieve Analysis, % | | | | | | |
| +80 Mesh | 30.0 | 0.7 | 21.0 | 2.9 | 1.1 | — |
| −80 + 325 Mesh | 35.0 | 20.9 | 4.1 | 28.9 | 24.6 | — |
| −325 Mesh | 35.0 | 78.4 | 74.9 | 68.2 | 74.3 | — |
| Fisher Subsieve Size, μm | | | | | | |
| (−80 Mesh) | 7.10 | 2.30 | 7.20 | 2.60 | 2.70 | 5.85 |
| Scott Density, g/in$^3$ | | | | | | |
| (−80 Mesh) | 52.4 | 36.5 | 62.4 | 41.3 | 36.3 | 68.2 |
| Chemical Composition, ppm | | | | | | |
| $O_2$ | 809 | 1366 | 850 | 2159 | 1397 | — |
| C | <10 | 12 | — | 43 | 18 | — |
| N | 20 | 18 | — | 32 | 53 | 99 |
| Fe | 29 | 100 | 20 | 68 | 36 | 40 |
| Cr | <10 | 24 | 15 | 22 | 18 | 15 |
| Ni | <10 | 38 | 20 | 48 | 18 | 55 |
| Cb | <10 | <10 | <10 | <10 | <10 | <10 |

TABLE I-continued
PHYSICAL PROPERTIES AND CHEMICAL COMPOSITIONS OF AS-REDUCED POWDERS

| Example No. | 1 | 2 | 3 | 4 | 5 | 6 |
|---|---|---|---|---|---|---|
| Si | <10 | 35 | <10 | 17 | 40 | — |
| Ca | <10 | <10 | <10 | 14 | <10 | — |
| W | <50 | — | <50 | — | — | <50 |
| Na | <10 | — | — | — | — | — |

The data obtained from the tests run on anodes made from the powders of Examples 1, 2, 4 and 5 when the powders were pressed to a green density of 6.45 g/cm$^3$ are shown in Table II:

TABLE II
ELECTRICAL CHARACTERISTICS OF SINTERED 1.0 GRAM ANODES OF AS-REDUCED, THERMALLY AGGLOMERATED, AND PHOSPHORUS-DOPED CAPACITOR POWDERS PRESSED TO GREEN DENSITY OF 6.45 g/cm$^3$
(ANODES SINTERED FOR 30 MIN. AT 1600° C.)

| Example No. | 1 | 2 | 4 | 5 |
|---|---|---|---|---|
| As-Reduced Powder | | | | |
| Capacitance, μfv/g | 5393 | 7656 | 8538 | 8537 |
| DCL, μa/g | 3.8 | 2.5 | 2.7 | 3.9 |
| Dissipation Factor, % | 34 | 70 | — | 58 |
| Shrinkage During Sintering, % | 1.2 | 9.3 | 7.4 | 4.1 |
| Thermally Agglomerated Powder | | | | |
| (Agglomerated 1 hr. at 1400° C.) | | | | |
| Capacitance, μfv/g | 5976 | 7428 | 8954 | — |
| DCL, μa/g | 2.0 | 1.4 | 12.5 | — |
| Dissipation Factor, % | 36 | 38 | 40 | — |
| Shrinkage During Sintering, % | 1.6 | 7.4 | 4.9 | — |
| Phosphorus-Doped Powder | | | | |
| (Doped with 50 ppm P added as (NH$_4$)$_2$HPO$_4$, thermally agglomerated 1 hr. at 1400° C.) | | | | |
| Capacitance, μfv/g | — | 10,194 | 10,554 | — |
| DCL, μa/g | — | 3.0 | 17.5 | — |
| Dissipation Factor, % | — | 39 | 43 | — |
| Shrinkage During Sintering, % | — | 4.7 | 3.1 | — |

The data obtained from the test run on anodes made, or attempted to be made, from the powders of Examples 1, 2, 4 and 5 when the powders were pressed, or attempted to be pressed, to a green density of 5.5 g/cm$^3$ are shown in Table III:

TABLE III
ELECTRICAL CHARACTERISTICS OF SINTERED 1.0 GRAM ANODES OF AS-REDUCED, THERMALLY AGGLOMERATED, AND PHOSPHORUS-DOPED CAPACITOR POWDERS PRESSED TO GREEN DENSITY OF 5.5 g/cm$^3$
(ANODES SINTERED FOR 30 MIN. AT 1600° C.)

| Example No. | 1 | 2 | 4 | 5 |
|---|---|---|---|---|
| As-Reduced Powder | | | | |
| Capacitance, μfv/g | | 8901 | 9495 | — |
| DCL, μa/g | | 3.0 | 3.1 | — |
| Dissipation Factor, % | Could | 56 | — | — |
| Shrinkge During Sintering, % | | 10.1 | 8.1 | — |
| Thermally Agglomerated Powder | not | | | |
| (Agglomerated 1 hr. at 1400° C.) | | | | |
| Capacitance, μfv/g | press; | 8348 | 8428 | 7557 |
| DCL, μa/g | | 1.3 | 1.6 | 1.6 |
| Dissipation Factor, % | green | 29 | 28 | 27 |
| Shrinkage During Sintering, % | | 9.4 | 8.2 | 3.2 |
| Phosphorus-Doped Powder | strength | | | |
| (Doped with 50 ppm P added as (NH$_4$)$_2$HPO$_4$, thermally agglomerated 1 hr. at 1400° C.) | too | | | |
| Capacitance, μfv/g | low | 11,160 | 10,155 | 10,158 |
| DCL, μa/g | | 3.8 | 5.1 | 4.0 |

TABLE III-continued
ELECTRICAL CHARACTERISTICS OF SINTERED 1.0 GRAM ANODES OF AS-REDUCED, THERMALLY AGGLOMERATED, AND PHOSPHORUS-DOPED CAPACITOR POWDERS PRESSED TO GREEN DENSITY OF 5.5 g/cm$^3$
(ANODES SINTERED FOR 30 MIN. AT 1600° C.)

| Example No. | 1 | 2 | 4 | 5 |
|---|---|---|---|---|
| Dissipation Factor, % | — | 34 | 33 | 35 |
| Shrinkage During Sintering, % | | 4.2 | 5.6 | 3.8 |

What is claimed is:

1. The process of producing a metal powder of the group consisting of tantalum and columbium powders which comprises maintaining a liquid bath of a double salt of the formula $$R_2MX_7$$

wherein R is an alkali metal, M is a metal of the group consisting of tantalum or columbium and X is a halogen atom of the group consisting of fluorine, chlorine, or bromine, and a diluent comprising an alkali metal halide at a temperature above the liquidus temperature of said salt mixture but not exceeding 760° C. in a closed reaction vessel, adding a molten alkali metal to said bath at a rate of at least 0.2 kg per kg of said double salt per hour during a nucleation period until a desired reaction temperature between 760° C. and 1000° C. is reached, the temperature rise during said nucleation period being at a rate of at least 10° C. per minute, thereafter adding additional molten alkali metal to said bath at a rate of at least 0.1 kg per kg of said double salt per hour during a growth period while providing forced cooling to said bath at a rate of at least 10 kilocalories per minute per kilogram of said double salt, continuously agitating said liquid bath, continuously producing crystals of said metal M and collecting said crystals in a lower portion of said reaction vessel, said rate of alkali metal addition and said rate of forced cooling being balanced to maintain the reaction temperature in said growth period within 50° C. of said desired reaction temperature but in excess of 760° C.

2. The process of claim 1 wherein said double salt is K$_2$TaF$_7$, said molten alkali metal is sodium and said diluent is selected from the group consisting of NaCl, KCl and mixtures thereof.

3. The process of claim 2 wherein said forced cooling includes a high velocity air stream applied to the exterior of said reaction vessel.

4. The process of claim 3 wherein said forced cooling is applied throughout the period of sodium addition.

5. The process of claim 2 wherein said diluent salt is NaCl and is present in said liquid bath in a weight ratio from about 0.25 to about 1.0 with respect to said K$_2$TaF$_7$.

6. The process of claim 5 wherein said weight ratio is from about 0.6 to about 1.0 and said process produces a tantalum metal powder having an average particle size less than about 5 microns, measured by the Fisher Sub-Sieve Sizer.

7. The process of claim 5 wherein said weight ratio is from about 0.25 to about 0.60 and said process produces a tantalum powder having an average particle size between about 5 and about 8 microns, measured by the Fisher Sub-Sieve Sizer.

8. The process of claim 2 wherein at least 50% of the weight of said tantalum crystals is −325 Mesh.

9. The process of claim 2 wherein said salt bath is maintained at a temperature not exceeding 660° C. before the start of sodium addition.

10. The process of claim 2 wherein the temperature in said growth period is maintained within 25° C. of said desired reaction temperature.

11. The process of claim 2 wherein the temperature in said growth period is maintained within 10° C. of said desired reaction temperature.

12. The process of claim 2 wherein the temperature in said growth period is maintained between about 760° C. and about 850° C. and said tantalum crystals average from about 5 microns in size by Fisher Sub-Sieve Sizer.

13. The process of claim 2 wherein the temperature in said growth period is maintained between about 850° C. and about 1000° C. and said tantalum crystals average less than about 5 to about 8 microns in size by Fisher Sub-Sieve Sizer.

14. The process of claim 1 in which said agitation is provided by an agitator maintained above the level of the formed tantalum metal crystals that collect in said reaction vessel and below the liquid level of the said bath by raising the level of said agitator during the period of sodium metal additions.

15. The process of claim 1 in which said agitation is provided by an agitator having a shaft and having blades which measure about one-half the reaction vessel diameter, said blades having a pitch in the range of 30° to 60° with respect to said agitator shaft, and said agitator rotates at a speed in the range of 0.05 to 0.50 rpm per kg of said salt mixture when the total weight of said mixture is in the range of 500 to 1000 kg.

16. The process of claim 15 in which the agitator rotational speed is varied within said range at least once during the reaction cycle.

17. The process of producing a tantalum powder which comprises maintaining a liquid bath of potassium fluotantalate and from about 0.6 to about 1.0 parts by a diluent comprising sodium chloride at a temperature above the liquidus temperature of said salt mixture but not exceeding 660° C. in a closed reaction vessel, adding molten sodium to said bath at a rate of at least 0.2 kg per kg of said potassium fluotantalate per hour during a nucleation period until a desired reaction temperature between 760° C. and 850° C. is reached, the temperature rise during said nucleation period being at a rate of at least 20° C. per minute, thereafter adding additional molten sodium to said bath at a rate of at least 0.1 kg per kg of said potassium fluotantalate per hour during a growth period while providing forced cooling to said bath by means of a high velocity air stream applied to the exterior of said vessel to extract heat at a rate of at least 10 kilocalories per minute per kilogram of said potassium fluotantalate, continuously agitating said liquid bath with an agitator maintained within said bath, continuously producing crystals of tantalum and collecting said crystals in a lower portion of said reaction vessel, said rate of alkali metal addition and said rate of forced cooling being balanced to maintain the reaction temperature in said growth period within 25° C. of said desired reaction temperature but in excess of 760° C.

18. The process of claim 17 in which said forced cooling includes a high velocity stream of carbon dioxide applied to the exterior of said vessel.

* * * * *